United States Patent [19]

Hayner

[11] Patent Number: 4,650,692
[45] Date of Patent: Mar. 17, 1987

[54] METAL-SULFONATE/PIPERIDINE DERIVATIVE COMBINATION PROTECTIVE COATINGS

[75] Inventor: Roger E. Hayner, Flatwoods, Ky.

[73] Assignee: Ashland Oil, Inc., Ashland, Ky.

[21] Appl. No.: 794,209

[22] Filed: Nov. 1, 1985

[51] Int. Cl.$^4$ .................. B05D 1/04; B05D 1/06; B05D 5/00; C04B 9/02

[52] U.S. Cl. ................. 427/27; 106/14.27; 106/14.28; 106/14.29; 427/428; 427/429; 427/435; 428/467; 428/470

[58] Field of Search .............. 106/14.27, 14.28, 14.29; 427/388.5, 435, 27, 428, 429; 428/467, 469, 470

[56] References Cited

U.S. PATENT DOCUMENTS

| | | | |
|---|---|---|---|
| 3,242,079 | 3/1966 | McMillen | 252/33 |
| 3,372,115 | 3/1968 | McMillen | 252/33 |
| 3,565,843 | 2/1971 | Kassinger et al. | 106/14.29 X |
| 3,746,643 | 7/1973 | Rogers | 252/33 |
| 3,754,942 | 8/1973 | Moradian | 106/14.27 |
| 3,888,380 | 6/1975 | Gribens et al. | 220/81 |
| 3,897,427 | 7/1975 | Sauter | 260/247.1 |
| 4,124,564 | 11/1978 | Minagawa et al. | 260/45.8 |
| 4,225,703 | 9/1980 | Amann et al. | 528/480 |
| 4,253,976 | 3/1981 | Forsberg | 252/33 |
| 4,260,500 | 4/1981 | Forsberg | 252/33 |
| 4,277,474 | 7/1981 | Kohda et al. | 424/248.57 |
| 4,315,912 | 2/1982 | Kalopissis et al. | 424/70 |
| 4,344,877 | 8/1982 | Nikles et al. | 524/102 |
| 4,491,535 | 1/1985 | Carlos et al. | 252/389.61 |

OTHER PUBLICATIONS

"Ultraviolet Light Inhibitors", BASF Wyandotte Corporation, Uvinul Dept., Parsippany, NJ 07054.
"Uvinul UV Inhibitors for Cosmetics Plastics Coatings Textiles," BASF Corporation, Uvinul Dept., Parsippany, NJ.
"Irganox 1076 Antioxidant & Thermal Stabilizer", Additives Dept., Ciba-Geigy Corporation, Ardsley, NY 10502.
"Tinuvin 328 Ultraviolet Light Absorber for Plastics and Coatings", Additives Dept., Ciba-Geigy Corp., Hawthorne, NY 10532.
"Tinuvin 144 Light Stabilizer", Additives Dept., Ciba-Geigy Corporation, Ardsley, NY 10502
"Light and Heat Stabilizer of Coatings", Ciba-Geigy Corp. Coatings, Inks & Photography Business Center, Additives Dept., Ardsley, NY.
"Uvinul 408", BASF Wyandotte Corporation, Uvinul Dept., Parsippany, NJ 07054.
"Eastman Inhibitor DOBP", Eastman Chemicals Products, Inc., Kingsport, TN (publication No. D-124D).
"New Developments in the Stabilization of Automotive Paints", Sandoz Chemicals Corporation, Charlotte, NC 28205.
"SACI Rust Prevention Concentrates", Witco Chemical Sonneborn Division, New York, NY 10017.
"Multiwax Microcrystalline Waxes from Sonneborn: The Standard of the Industry," Witco Corp., Sonneborn Div., New York, NY.
"Technical Bulletin", Sandoz Colors & Chemicals, Charlotte, NC.

Primary Examiner—Michael R. Lusignan
Attorney, Agent, or Firm—Richard C. Willson, Jr.

[57] ABSTRACT

Adding a combination of sterically hindered tertiary amines or derivatives, e.g. piperidine and derivatives, with overbased metal (e.g. calcium, magnesium, barium, zinc, etc.) sulfonate, wax and oxidized petrolatum solvent based rust preventative compositions dramatically increases weather and salt-fog protection.

32 Claims, 3 Drawing Figures

FIG. 1
XENON WEATHEROMETER
COMPARISON OF UNPIGMENTED SYSTEMS

FIG. 2
XENON WEATHEROMETER
COMPARISON OF PIGMENTED SYSTEMS

METAL-SULFONATE/PIPERIDINE DERIVATIVE COMBINATION PROTECTIVE COATINGS

CROSS-REFERENCES TO RELATED APPLICATIONS

The present invention relates to the general field of co-pending U.S. Ser. No. 271,906, filed June 9, 1981, now U.S. Pat. No. 4,388,244, patented June 14, 1983.

BACKGROUND OF THE INVENTION

1. Field of the Invention

The present invention relates to the field of corrosion resistant coatings, more particularly solvent-based coatings comprising corrosion inhibitors, e.g. of the gelled metal sulfonate-type or of the metal soaps of oxidized petrolatums and waxes.

2. Prior Art

U.S. Pat. No. 4,491,535 to Donald D. Carlos and Keith Friley teaches hydrocarbon oxidate compositions comprising the reaction products of (a) hydrocarbon oxidates or their metal salts with; (b) polyamines; and (c) copolymer(s) of olefin and a comonomer of an unsaturated carboxylic acid or a vinyl ester of a saturated carboxylic acid and further comprising a wax oxidate, a petrolatum oxidate or mixtures. Such products have very high viscosity and sinewy characteristics. These "oxwax" products can be employed in the compositions of the present invention.

U.S. Pat. No. 4,344,877 to Nikles et al teaches wax-like bis-1-n-octadecyl-2,2,6,6-tetramethyl-4-piperidyl bicyclo [2,2,1]hept-5-ene-endo,exo-2,3-dicarboxylate in his Example 9.

U.S. Pat. No. 3,897,427 to Sauter reaches compositions comprising carnauba wax and piperidino compounds.

Similarly, U.S. Pat. No. 3,888,380 to Gribens et al teaches compositions comprising piperidinium-pentamethylene compounds with paraffin wax in the preparation of polyepichlorohydran aerosol gaskets.

U.S. Pat. No. 4,315,912 to Kalopissie et al teaches cosmetic compositions for application to the skin or hair comprising natural waxes and piperidinyl derivatives.

U.S. Pat. No. 4,277,474 to Kohda et al teaches treatment of allergic symptoms with compositions comprising emulsified wax and piperidinopropiophenone hydrochloride.

U.S. Pat. No. 4,225,703 to Amann et al teaches piperidine derivatives in combination with lubricants such as waxes for molding compositions.

U.S. Pat. No. 4,124,564 to Minagawa et al teaches synthetic resin stabilizers comprising piperidine and wax ester lubricants.

U.S. patents on the preferred organic sulfonates discussed in this specification include:

U.S. Pat. No. 3,746,643 to Rogers—Continental Oil Company (now Witco's);

U.S. Pat. No. 3,372,115 to McMillen—Lubrizol Corporation;

U.S. Pat. No. 3,242,079 to McMillen—Lubrizol Corporation;

U.S. Pat. No. 4,260,500 to Forsberg—Lubrizol Corporation

U.S. Pat. No. 4,253,976 to Forsberg—Lubrizol Corporation

None of the prior art teaches the discovery of the present invention, that the combination of gelled metal sulfonates with sterically hindered tertiary amines dramatically improves corrosion protection, e.g. weathering, salt spray.

SUMMARY

1. General Statement of the Invention:
2. Utility:

The present invention is valuable for a wide variety of purposes to which protective coatings can be put including without limitation, protection of structural metals, vehicles, electrical components, telecommunications devices and other surfaces.

DESCRIPTIONS OF THE PREFERRED EMBODIMENTS

Starting Materials

Figure 1:
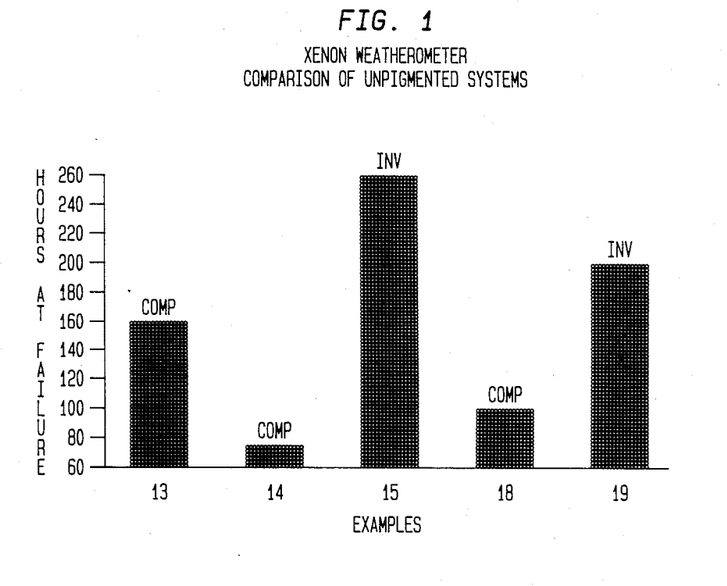
FIG. 1 is a bar graph showing the relative time to failure for various unpigmented system Example using various absorbing ingredients as measured on a Weatherometer using ASTM Test G-26-83.
Figure 2:
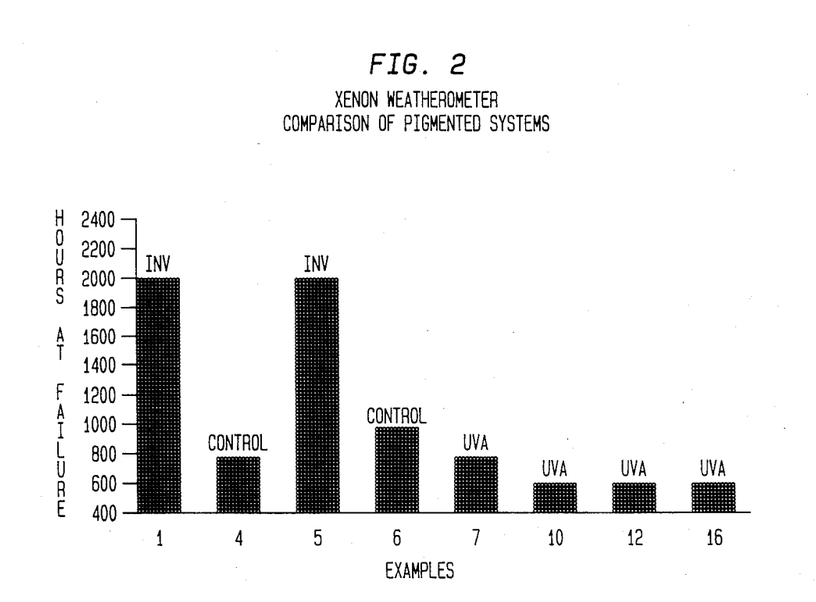
FIG. 2 is a similar bar graph comparing pigmented system Examples on the Weatherometer.
Figure 3:
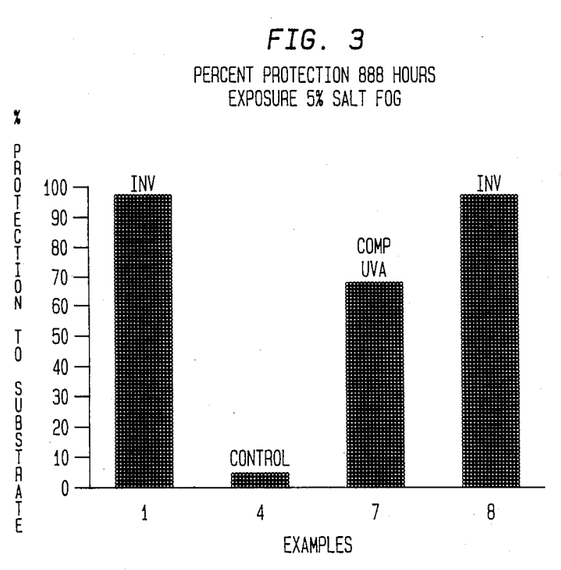
FIG. 3 is another similar bar graph comparing various system of the Examples under salt spray rather then Weatherometer.

Waxes:

Preferably the compositions of the present invention will include refined microcrystalline wax which contains less than 0.1 to about 5 and more preferably 0.1 to about 3 weight percent oil based on the weight of the wax combined with esterified waxes though other types of wax may occasionally be substituted for specialized applications. Preferred wax melting points will be above 50° C. (148° F.), more preferably from 60° to 100° C. (140° to 212° F.), and most preferably from 65° to 90° C. (150° to 194° F.). Such micro waxes can be naturally derived, e.g. those manufactured in the processing of petroleum crude oils, or synthetically manufactured, e.g. polyolefin waxes such as polyethylene or polypropylene waxes. The average molecular weight of the waxes useful in the present invention should be selected so as to provide good film formation and permanence but molecular weight is not narrowly critical and will be easily selected by those skilled in the art. Also, the degree of branching in the wax molecules should be selected so the average degree of crystallinity permits the wax to be easily dispersed and to be compatible with the other ingredients of the particular formulation being produced. Chain branching provides sites for esterification in the case of oxygenated waxes; these are also suitable for use in most applications with the present invention. Oxygenated waxes (oxwax) will preferably have an acid number in the range of from about 5 to about 200, most preferably from 15 to about 45. The wax can contain at least 50% essentially saturated wax based on the total weight of the wax.

Specific waxes useful for the present invention include: natural waxes, such as a semi-refined paraffin available from Shell Oil of Houston; petrolatum, widely available; synthetic waxes, such as polyethylene waxes available from Bareco Corporation of Tulsa, Oklahoma or the Epolene brand available from Eastman Kodak of Rochester, New York microwaxes such as "Multiwaxes" available from Witco Chemical, Sonneborn Division, New York, NY 10017, or Polywax 55 (Bareco) and Mobil Microwax 2305 (Mobil Oil); or oxygenated waxes, which can be readily manufactured in petroleum refineries utilizing well-known techniques, or those available from Durachem Corporation of Harrison, New York.

The amount of waxes to be utilized with the present invention is not narrowly critical and, in fact, for special applications the wax can even be omitted with additional quantities of sulfonates described below being employed. For most formulations the wax content will be from 0.5 to 30%, more preferably from about 5 to 25% and most preferably from about 5 to about 15% by weight.

All percents given herein are percents by weight based on the weight of the total formulation unless otherwise expressly stated.

Organic Sulfonates:

A particular feature of the present invention is the inclusion in the formulation of organic sulfonates. For best corrosion protection, it has been discovered that the preferred organic sulfonates are over-based (i.e., made with an excess of calcium or other metal carbonate). The most preferred type of organic sulfonate is the Severe Atmospheric Corrosion Inhibitor ("SACI") available commercially from Witco Chemical Company of New York, N.Y., described in the patents. These over-based sulfonates are the reaction products of an overbased metal salt of sulfonic acid with carbon dioxide, water and alcohols. They impart exceptional corrosion protection and mix well with the other components of the invention. The preferred mixing order is to use the SACI or other organic sulfonates as the first ingredient, thus permitting the other ingredients to interreact prior to the introduction of the piperidine derivatives.

The preferable sulfonates are overbased with barium, calcium or sodium, and have sufficient equivalent weight to provide extended rust protection against corrosive environments. The preferable equivalent weights of these sulfonates, which are derived from alkyl benzene, are as follows when overbased with the following metal sulfonates: sodium sulfonate or a equivalent weight preferably 370 to 750, more preferably 400 to 650 and most preferably 450 to 600; barium sulfonate of a equivalent weight preferably 400 to 1400, more preferably 700 to 1300, most preferably 800 to 1200; and calcium sulfonate to a equivalent weight preferably 370 to 850, more preferably 400 to 800, most preferably 500 to 750.

The organic sulfonates of the present invention will generally be employed in quantities of from about 10 to about 98%, more preferably from about 50 to about 95% and most preferably from about 60 to about 90% based on the total weight of the formulation.

Sterically Hindered Tertiary Amines (SHTA):

The invention's stabilizers against both heat and light degradation are sterically hindered tertiary amines (SHTA's), most preferably piperidyl derivatives.

Preferred derivatives are those obtained by the 4 position substitution of 1,2,2,6,6-penta methyl-piperidin-4-ol with an aliphatic dicarboxylic acid. Examples of aliphatic dicarboxylic acids are those having from 2-20 carbons, more preferably alkane dicarboxylic acids having 6 to 10 carbon atoms such as malonic, succinic, glutaric, adipic, pimelic, suberic, azelaio, sebacic, 1,12-dodecanedioic, 1,18-octadecanedioic, 1,20-docasanedioic acid and N-methylliminodiacitic acid. Molecular weights are generally 100 to 1500, more preferably 200 to 1000. Most preferred ester for this invention is the ester of from sebacic acid (molecular weight=508). Discussion of this and alternate preparations are given in U.S. Pat. No. 4,021,432 to Holt and Randall (Ciba Giegy). Similar hindered amine-type additives are VP Sanduvor ® 3050 and 3052 manufactured by Sandoz Chemicals, Charlotte, NC 28205.

Particularly preferred are certain piperidines manufactured by Ciba-Geigy under the trademark Tinuvin ® especially those designated Tinuvin ® 292 (bis (1,2,2,6,6-pentamethyl 1-4-piperidinyl) sebacate). Most preferred are mixtures of Tinuvins ® 292 and 328. The 328 is a substituted benzotriazole and, while valuable as an additive to the compositions of the present invention, does not provide the piperidine or piperidine derivative compound which is an essential component of the compositions of the invention.

Substantial technical literature on the preferred piperidine derivatives can be found in U.S. Pat. No. 4,046,737, U.S. Pat. No. 4,021,432 and U.S. Pat. No. 4,049,647, all to Holt and Randall of Ciba-Geigy. These compounds are also discussed in "Heat and Light Stabilization of Coatings", publication A2885M70 (1980) (1980). Other brochures include Tinuvin ® 292, publication A-3055M71 (1981) and Tinuvin ® 328, publication 184A1M13 (1983), all of Ciba-Geigy Corporation, 3 Skyline Drive, Hawthorne, New York 10502.

While upper limits are primarily limited by economics, the SHTA compounds will generally be used in the inventive formulations at levels of 0.1 to 10 wt.%, more preferably 0.2 to 8 and most preferably 0.5 to 5 wt%. (See SHTA system Examples 1, 3, 5, 15 and 19).

UV Absorbers (U.V.A.)

Additives found to be surprising less effective, included Tinuvin ® 144, publication A2675M109 (1979). of Ciba-Geigy. Other non-piperidine UV light absorber compounds which were found to be much less effective with the present invention were Neville-Synthese Organics Syntase, 100, 800/805, 62, 1200 and 230; American Cynamid Cyasorb UV-531 and UV-9; Thiokol Carstab-700/705; Ferro AM-300 and AM-320; BASF Uvinul-400, -408, M-40, MS-40; Argus Mark-1413 and Eastman Chemical DHBP and DOBP. Table I below sets forth the chemical structure of each of these formulations which, though well known as UV light absorbers proved to be suprisingly less effective in the formulations of the present invention. Zinc oxide is also a common U.V. absorber. (See U.V.A. system, Examples 7, 9, 10, 11 and 17).

Antioxidants:

In some coating systems, these can act as scavengers for ultraviolet-light-induced peroxides and free-radicals, limiting polymer degradation. Two antioxidants tried were Irganox ® 1076 described in publication A276A5M31 of Ciba-Geigy and Neva Stain 21 manufactured by Neville Chemical Company respectively). Neither was noticeably effective with the coatings systems of the invention. (See Examples 18 and 12.)

TABLE I

| | UV Light Absorbers (Comparative) | | | | | | |
|---|---|---|---|---|---|---|---|
| Chemical Type | Neville-Synthese Organics (SYNTASE) | American Cyanamid (CYASORB) | Thiokol (CARSTAB) | Ferro (AM) | BASF (UVINUL) | Argus (MARK) | Eastman Chemical |
| 2,4-Dihydroxy-benzophenone | 100 | — | — | — | 400 | — | DHBP |
| 2-Hydroxy-4-n-oxtoxy-benzophenone | 800/805 | UV-531 | 700/705 | 300 | 408 | 1,413 | — |
| 2-Hydroxy-4-methoxy-benzophenone | 62 | UV-9 | — | — | M-40 | — | — |
| 2-Hydroxy-4-n-dodecyloxy-benzophenone | 1,2000 | — | — | 320 | — | — | DOBP |
| 2-Hydroxy-4-methoxy-benzophenone 5-sulfonic Acid | 230 | — | — | — | MS-40 | — | — |

While the piperidinol compounds utilized with the present invention are themselves known to be effective and improving resistance to ultraviolet light, a number of other compounds, also known to be effective against ultraviolet light are suprisingly ineffective in the formulations of the present invention. For example, benzotrizoles, substituted benzophenones (such as the Syntase series discussed below), and other compounds such as those discussed below in BASF Wyandotte Corp., 100 Cherry Hill Road, Box 181, Parsippany, NJ 07054 brochure entitled "Uvinul ™ UV inhibitors for Comestics, Plastics, Coatings, Textiles" -400, -408, M-40, MS-40; Argus Mark-1413 or Eastman DOBP*. (Chemical Abstracts Number 2985-59-3), described in publication D-124D of Eastman Chemicals Products, Inc., Kingsport, TN 37662.

Diluent Oils:

The formulations should preferably contain diluent oils which help to solubilize the formulations and which remain in the finished film to impart flexibility. Examples are: mineral lubricating oils obtained by and conventional petroleum refining procedures, synthetic lubricating oils e.g. polymers of propylene, polyoxyalkylenes, polyoxypropylene, di-carboxylic acid esters, phosphorus esters, etc. The viscosity will preferably be from about 100 to about 700, more preferably 150 to 500 and most preferably 200 to 350 SUS at 210° F.

From 0 to 10%, more preferably 3 to 8% and most preferably 4 to 6% by weight of the diluent oil can be used.

Resins:

Various resins, including alkyd, silicone and linseed oil, were investigated without noting significant improvement in the systems of the invention. (See Example 8, Aroplaz 1266 by Spencer-Kellogg, Buffalo, NY), 13 (Dow Corning Q1-2530 silicone, Midland, MI), 16 (Kelsol 1271 Spencer-Kellogg, Buffalo, NY), 20 (Cargill 5117, Cargill, Minneapolis, MN).

Organic Solvents:

Several types of solvents can be employed with the invention including liquid hydrocarbon solvents, kerosene and mineral spirits.

The solvents of the present invention will generally be employed in quantities of from about 5% to about 85% or more, more preferably from about 25 to about 55%, and most preferably from about 35 to about 50% based on the weight of the total formulation. In addition to acting as a solvent, the solvent will usually be useful during the drying and curing process after application of the coatings composition of the present invention to substrates.

Base Number:

Base numbers (determined by titration of the formulation with standard HCl) will generally range from approximately 50–200, more preferably from 100–150 and most preferably from 120–140.

Pigments:

Pigments utilized can be 10X (1-part concentrate to 9-parts base by volume) standard red and 10X extra red concentrates. Preferred color concentrates are manufactured using Tectyl 506EH as a base, available from Valvoline Oil Company, Freedom, Pa. Tectyl ® based concentrates are preferred over various resin concentrates available commercially because they are more stable in the system and do not hinder performance.

Ranges of addition are 0.5–20.0 weight percent, more preferably 5–15 percent and most preferred 8–12 percent. Reds were chosen in this test work primarily because they offer little benefit to the polymer for weatherability. Other pigmentations can be aluminum, carbon black, iron oxides, pthalocyanine greens and blues, and various others normally used by those familiar with the art.

Techniques in Mixing:

Apparatus: The apparatus for the present invention will be that conventionally utilized in the preparation of coatings compositions, e.g. kettles and mixing tanks having flow metering or measuring devices and agitation means, e.g. pumps mounted on side-arms connecting with the main vessel, internal stirrers, contra-rotating shearing devices and any of the other available devices which are well known to the art.

Temperature: The temperature during mixing may be different during different stages in the formulation. These temperatures are not narrowly critical and will vary to provide faster mixing or better compatability of ingredients according to observation of those skilled in the art. For example, pressure vessels may be utilized for the purpose of lowering ingredient melting and boiling points, where useful, in order to provide better dispersion of difficult-to-mix ingredients.

Mixing Procedure: While the formulations of the present invention may be manufactured continuously if desired, batch techniques will be more usually employed. Heating is discontinued after addition of the waxes and pigments. The piperidine derivatives are then mixed in and the finished formulation is allowed to cook with, preferably, constant agitation, after which the formulation is drawn off into shipping containers, e.g. tank cars, tank trucks, drums or smaller cans. Particularly preferred embodiments, the piperidine derivative with or without any other additives such as UV absorbers, are mixed with portion, e.g. 5–15% of the solvent in a separate vessel and this premix is then added to the main mixing vessel as the final ingredient. This technique speeds the dispersion and avoids any agglomeration of the piperidine derivative, UV absorber or other additives.

Quality Control:

The finished formulation, prior to packaging, will generally be checked for viscosity, solids content, freeze-thaw stability, film build, spray ability, corrosion-protection under accelerated conditions and other tests utilizing techniques well known to the coatings industry.

Application:

The formulations of the present invention may be applied to substrates to be protected by conventional application techniques, such as spraying, brushing, dipping, flow-coating, electrostatic airless spraying. Coating thickness can be varied by changing the formulation, the number of coats, or the amount applied per coat but in general will be in the range from about 2 to about 5 mils after drying.

EXAMPLES

Example 1

(Formulations according to the invention providing long term corrosion protection)

To a conventional mixing kettle equipped with high shear rotary agitator are added, in order: 72.9 parts by weight of SACI calcium sulfonate, an overbased-sulfonate manufactured by Witco Chemical Company and described above under "Sulfonates" and heated to 240° F.; 7.3 parts of molten oxidized petrolatum having an acid value of 15. These components are allowed to be mixed until homogeneous and the acidity of the petrolatum has been neutralized by the overbasing of SACI material. To this mixture is added 7.3 parts of molten microwax manufactured by Witco under the trademark "Multiwax", continuing agitation. The mixture is allowed to cool to approximately 130° F. temperature and at this point 12.5 parts of a 10X standard red pigment concentrate is added. To this composition is added 1.0 parts of Tinuvin 292, the SHTA piperidine derivative manufactured by Ciba-Giegy and discussed above under "Piperidine Derivatives", and 1.0 parts of Tinuvin 328, the UV Absorber also discussed above. Agitation is continued through the addition of all of the ingredients. Heating is discontinued after addition of waxes as shear energy itself is sufficient to maintain temperatures in 43°–60° C. (110°–140° F.) range. Agitation is continued for about 2 hours until the mixture is entirely homogeneous. Viscosity and non-volatile content are adjusted by the addition of Rule 66 mineral spirits due to offset loss during blending.

The homogeneous batch is sampled for quality control and the viscosity is found to be about 8,000 centipoises at 25° C. by Brookfield viscometer, using number 5 spindle at 10 rpm. Weight of solids is found to be 50–55%.

The resulting product is tested for corrosion resistance by applying to a cold rolled 1010 steel panel. After drying for 72 hours, the test panel is subjected to a 5% salt (NaCl) spray at a temperature of 95° F. (35° C.) according to ASTM Test B-117. The test panel resists failure (corrosion) for over 2,000 hours.

A similar test panel coated with the formulation of this Example 1 resists 3,000 hours of exposure to 100% relative humidity at 120° F. (44° C.) according to the techniques of ASTM D-1748.

A similar test panel coated with the formulation of this Example 1 resists 2000+ hours of exposure to a Xenon light Weatherometer operated according to ASTM G-26-83.

A similar test panel coated with the formula of Example 1 resists 1000+ hours of 5% salt for (ASTM B-117) testing after being exposed for 1000+ hours of Atlas CI65 Xenon Weatherometer (ASTM G-26-83) testing.

A sample of the above formulation survived 5 successive freeze-thaw cycles each comprising 16 hours at 0° F. (−18° C.) followed by 8 hours at 77° F. (25° C.) with no separation or other evident deleterious effect. A sample of the above formulation withstands 144 hours at 120° F. (49° C.) without separation or other observable degradation.

When a sample as previously described is coated by use of a Gardner drawdown bar with the above formulation and allowed to dry at room temperature (77° F., 25° C.), approximately 50% relative humidity, the coating is cured and dry to the touch in about 2–4 hours.

The dry film thickness on the above test panel is approximately 4 mils (approximately 102 microns).

Examples 2–18

When various formulations are produced and tested according to the techniques of Example 1 but using the respective parameters set forth in Table II, the results are as described in Table II.

TABLE II (Parts By Weight)

| | 1 INV | 2 COMP | 3 INV | 4 COMP | 5 INV | 6 COMP | 7 COMP | 8 COMP | 9 COMP | 10 COMP |
|---|---|---|---|---|---|---|---|---|---|---|
| RUN # | B1386-7111 | B1026-1861A | B1026-1861B | B1386-71-1 | B1026-195B | B1026-195A | B1386-71-7 | B1386-43A-9 | B1026-191-1 | B1026-191-2 |
| Wax: | | | | | | | | | | |
| Microwax | 7.3 | 7.6 | 7.6 | 7.3 | 00 | 00 | 7.3 | 8.3 | 7.3 | 7.3 |
| Oxpet TAN 15 | 7.3 | 7.6 | 7.6 | 7.3 | — | — | 7.3 | 8.3 | 7.3 | 7.3 |
| Sulfonate | | | | | | | | | | |
| Ca Sulfonate (60% Rule 66 min sprts) "SACl" | 72.9 | 76.4 | 76.4 | 72.9 | — | — | 72.9 | 83.4 | — | — |
| Lubrizol OS 65417A (I) | — | — | — | — | 91.9 | 91.9 | — | — | — | — |
| Sulfonate: | | | | | | | | | | |
| SACl 740 (60% Rile 66 mineral spirits) | | | | | | | | | 72.9 | 72.9 |
| Lubrizol OS 65417A | | | | | | | | | | |
| SHTA Derivative: | | | | | | | | | | |
| Linuvin 292 | 1.0 | — | 2.0 | — | 2.4 | — | — | — | — | — |
| Piperidine Derivative: | | | | | | | | | | |
| Linuvin 292 | | | | | | | | | | |
| U.V. Absorbers: | | | | | | | | | | |
| Linuvin 328 UV | 1.0 | — | — | — | — | — | 1.0 | — | 1.0 | 1.0 |
| Syntase 1200 | | | | | | | | | | |
| Syntase 800 | | | | | | | | | | |
| Syntase 62 | | | | | | | | | | |
| Zinc Oxide | | | | | | | | | | |
| Antioxidants: | | | | | | | | | | |
| Neva Stain 21 | | | | | | | | | | |
| Irganox 1076 | | | | | | | | | | |
| Resins: | | | | | | | | | | |
| Dow Corning Q1-2530 (silicone resin) | | | | | | | | 2.0 | | |
| Spencer Kellogg Aroplaz 1266 (long-oil soya alkyd) | | | | | | | | | | |
| Kelsol 1271 (Linseed alkyd) | | | | | | | | | | |
| Cargill 5117 (alkyd) | | | | | | | | | | |
| Pigment: | | | | | | | | | | |
| 10X Red Pigment Concen. (Standard) | 12.5 | 8.4 | 8.4 | 12.5 | 8.1 | 8.1 | 12.5 | — | 12.5 | 12.5 |
| 10X Red Pigment Concen. (Extra) | — | — | — | — | — | — | — | — | — | — |
| Total Parts by Weight: | 102.0 | 100.0 | 102.0 | 100.0 | 102.4 | 100.0 | 101.0 | 102.0 | 101.0 | 101.0 |
| Test Results: | | | | | | | | | | |
| Storage Stability | Pass | Pass | Pass | Pass | Pass | Pass | Pass | Pass | Pass | Pass |
| Freeze-Thaw | Pass | Pass | Pass | Pass | Pass | Pass | Pass | Pass | Pass | Pass |
| Viscosity | 8000 CPS | 12,000 CPS | 11,600 CPS | 9,600 CPS | 40,000 | 42,500 | 8,400 CPS | 7,600 CPS | 8,800 | 8,400 CPS |
| Film Integrity | Semi-Firm | Semi-Firm | Semi-Firm | Semi-Firm | Firm | Firm | Semi-Firm | Semi-Firm | Semi-Firm | Semi-Firm |
| Drytime (Hours) | 3.0 | 3.0 | 3.0 | 3.0 | 2.5 | 2.5 | 3.0 | 16 | 3.0 | 3.0 |
| Salt Spray (ASTM B117) or Cold Rolled Steel (Bare) | 2,000 | — | — | 999 | — | — | 999 | 999 | — | — |
| Thickness (mil) DFT | 4.0 | 4.0 | 4.0 | 4.0 | 4.0 | 4.0 | 4.0 | 4.0 | 4.0 | 4.0 |
| Humidity (ASTM D-1748) | 3,000 | 3,000 | 3,000 | 3,000 | Excellent | — | 3,000 | — | — | — |
| Weatherometer (ASTM G26) Hrs.: | Excellent 2,000+ | Poor >560 | Excellent 560+ | Poor 750 | 2,000+ | Poor 983 | Poor >50 | Poor 106 | Poor 613 | 613 |
| Sprayability | Good | Good | Good | Good | Good | Good | Good | Good | Good | Good |

TABLE II-continued
(Parts By Weight)

| | 11 COMP | 12 COMP | 13 COMP | 14 COMP | 15 INV | 16 COMP | 17 COMP | 18 COMP | 19 INV | 20 COMP |
|---|---|---|---|---|---|---|---|---|---|---|
| Run # | | | | | | | | | | |
| WAX: | B1026-191-3 | B1026-191-4 | B1386-43A-7 | B1386-43B-23 | B1386-43A-4 | B1386-75B | B1386-75F | B1386-43A-3 | B1386-43A-2 | B1386-75E |
| Microwax | 7.3 | 7.3 | 8.3 | 8.3 | 8.3 | 7.3 | 7.3 | 8.3 | 8.3 | 7.3 |
| Oxpet TAN 15 | 7.3 | 7.3 | 8.3 | 8.3 | 8.3 | 7.3 | 7.3 | 8.3 | 8.3 | 7.3 |
| Sulfonate | | | | | | | | | | |
| Ca Sulfonate (60% Rule 66 min sprts) "SACI" | | | | | | | | | | |
| Lubrizol OS 65417A (1) | | | | | | | | | | |
| Sulfonate: | | | | | | | | | | |
| SACI 740 (60% Rule 66 mineral spirits) | 72.9 | 72.9 | 83.4 | 83.4 | 83.4 | 72.9 | 72.9 | 83.4 | 83.4 | 92.9 |
| Lubrizol OS 65417A | — | — | — | — | — | — | — | — | — | — |
| SHTA Derivative: | | | | | | | | | | |
| Linuvin 292 | | | | | | | | | | |
| Piperidine Derivative: | | | | | | | | | | |
| Linuvin 292 | — | — | — | — | 2.0 | — | — | — | 2.0 | — |
| U.V. Absorbers: | | | | | | | | | | |
| Linuvin 328 UV | — | — | — | — | 2.0 | — | — | — | — | — |
| Syntase 1200 | — | — | — | — | — | — | — | — | — | — |
| Syntase 800 | — | — | — | — | — | — | — | — | — | — |
| Syntase 62 | — | — | — | — | — | — | — | — | — | — |
| Zinc Oxide | 1.0 | — | — | — | — | — | 2.0 | — | — | — |
| Antioxidants: | | | | | | | | | | |
| Neva Stain 21 | — | — | — | — | — | — | — | 2.0 | — | — |
| Irganox 1076 | — | 1.0 | — | — | — | — | — | — | — | — |
| Resins: | | | | | | | | | | |
| Dow Corning Q1-2530 (silicone resin) | — | — | 5.0 | — | — | — | — | — | — | — |
| Spencer Kellogg Aroplaz 1266 (long-oil soya alkyd) | — | — | — | — | — | — | — | — | — | — |
| Kelsol 1271 (Linseed alkyd) | — | — | — | — | — | 2.0 | — | — | — | 2.0 |
| Cargill 5117 (alkyd) | — | — | — | — | — | — | — | — | — | — |
| Pigment: | | | | | | | | | | |
| 10X Red Pigment Concen. (Standard) | 12.5 | 12.5 | — | — | — | 12.5 | 12.5 | — | — | 12.5 |
| 10X Red Pigment Concen. (Extra) | — | — | — | — | — | — | — | — | — | — |
| Total Parts by Weight: | 101.0 | 101.0 | 105.0 | 100.0 | 104.0 | 102.0 | 102.0 | 102.0 | 102.0 | 102.0 |
| Test Results: | | | | | | | | | | |
| Storage Stability | Pass | Pass | Pass | Pass | Pass | Failed | Pass | Pass | Pass | Pass |
| Freeze-Thaw | Pass | Pass | Pass | Pass | Pass | Pass | Pass | Pass | Pass | Pass |
| Viscosity | 8,000 CPS | 8,400 CPS | 8,000 CPS | 14,000 CPS | 12,800 CPS | 7,600 CPS | 8,400 CPS | 13,200 CPS | 12,800 CPS | 7,600 CPS |
| Film Integrity | Semi-Firm | Semi-Firm | Semi-Firm | Semi-Firm | Semi-Firm | Semi-Firm | Semi-Firm | Semi-Firm | Semi-Firm | Semi-Firm |
| Drytime (Hours) | 3.0 | 3.0 | 3.5 | 3.0 | 3.0 | 24.0 | 3.0 | 3.0 | 3.0 | 16 |
| Salt Spray (ASTM B117) or Cold Rolled Steel (Bare) | — | — | — | 73.8 | 207.+ | — | — | — | — | — |
| Thickness (mil) DFT | 4.0 | 4.0 | 4.0 | 4.0 | 4.0 | 4.0 | 4.0 | 4.0 | 4.0 | 4.0 |
| Humidity (ASTM D-1748) | — | — | — | 3,000 | 3,000 | — | — | — | 3,000 | — |
| Weatherometer (ASTM G26) Hrs.: | 613 | 613 | 154 | — | — | 600 | 600 | 106 | 200 | 600 |
| Sprayability | Good | Good | Good | Good | Good | Good | Good | Good | Good | Good |

Notes: (1) Contains Was and/or Petrolatum

TABLE II-continued
(Parts By Weight)

Comments on Formulations:
Example 1: Invention utilizing combination of the SHTA with UVA in equal amounts with the Extra Red pigmented sulfonate and wax base of Example 4.
Example 2: Comparative control of Example 3. Standard Red pigmented sulfonate and wax base.
Example 3: Invention utilizing 2.0 parts of SHTA (Tinuvin 292) with components of Example 2.
Example 4: Comparative to Example 1 utilizing the Extra Red pigmented sulfonate and wax base.
Example 5: Invention utilizing 2.4 parts of the SHTA (Tinuvin 292) in a competitor base to SACI, pigmented with Standard Red as of Example 6.
Example 6: Comparative to Example 5 utilizing a competitive sulfonate base to the SACI, pigmented with Standard Red concentrate.
Example 7: Comparative to Example 1 of invention utilizing only 1 part of Tinuvin 328 UVA absorber (2(2'-hydroxy-3',5'-di-tert-amylphenyl)benzotriazole) with the ingredients of Example 4.
Example 8: Comparative to Example 19 of invention utilizing 2 parts long oil soya alkyd (Spencer Kellog Aroplaz 1265) in substitution for the SHTA in Example 19.
Example 9: Comparative to Example 1 of invention utilizing only 1 part of UVA Syntase 1200 (2-hydroxy-4-n-dodecyl-oxybenzophenone) with the ingredients of Example 4.
Example 10: Comparative to Example 1 of invention utilizing only 1 part of UVA Syntase 800 (2-hydroxy-4-n-oxtoxy-benzophenone) with the ingredients of Example 4.
Example 11: Comparative to Example 1 of invention utilizing 1 part of UVA Syntase 62 (2-hydroxy-4-methoxy-benzophenone) with the ingredients of Example 4.
Example 12: Comparative to Example 1 of invention utilizing only part anti-oxidant Nevastain 21 (styrenated phenol) with the ingredients of Example 4, SHTA of Example 1 being omitted.
Example 13: Comparative to Example 19 of invention substituting 5.0 parts of a silicone resin (Dow Corning Q1-2530) in substitution for the 2 parts SHTA of Example 19.
Example 14: Comparative example of the organic sulfonate and wax base as a control to invention Example 19.
Example 15: Invention example utilizing 2 parts of UVA Tinuvin 328 (2(2;-hydroxy-3'5'-di-tert amylphenyl) benzotriazole) in conjunction with equal parts of the SHTA of Example 19.
Example 16: Comparative example utilizing 2.0 parts of a linseed alkyd resin (Kelsol 1271) in place of the 1.0 parts each of the SHTA and UVA of Example 1.
Example 17: Comparative example utilizing 2.0 parts of UVA zinc oxide in place of the 1 part each of the SHTA and UVA of Example 1.
Example 18: Comparative example utilizing 2.0 parts of anti-oxidant Irganox 1076 (Octadecyl 3,5-di-tert-butyl-4-hydroxy hydro-cinnamate) in place of the 2.0 parts SHTA of Example 19.
Example 19: Invention example using 2.0 parts SHTA (Tinuvin 292) in addition to the ingredients of Example 14.
Example 20: Comparative example utilizing 2.0 parts alkyd resin (Cargill 5117) in place of the 1.0 parts each of the SHTA and UVA of Example 1.

Comments on Test Results:
Example 1: Best of all blends of SACI. Only slight fade after 2,000 hours in Weatherometer.
Example 2: Poor at 560 hrs. Heavily chalked and film hard and brittle.
Example 3: Excellent at 560 hrs. Zero fade or chalking. Film still soft and pliable.
Example 4: 90-100% rust at 888 hrs. Salt fog. Heavily chalked and flaking in Weatherometer at 750 hrs.
Example 5: Excellent at 2,000 hrs. in Weatherometer with slight chalking. Competition to SACI 740.
Example 6: Poor at 983 hrs. in Weatherometer. Film chalking and flaking. Competition to SACI 740.
Example 7: 30% rust at 888 hrs. Salt fog. 25% chalked at 750 hrs. in Weatherometer.
Example 8: Discolored at 106 hrs. in Weatherometer.
Example 9: Chalking heavily at 613 hrs. in Weatherometer.
Example 10: Best of all Syntase additives. Still had chalking at 613 hours in Weatherometer.
Example 11: Heavily chalked at 613 hrs. in Weatherometer.
Example 12: Heavily chalked at 613 hrs. in Weatherometer.
Example 13: Heavily discolored brown at 154 hrs. in Weatherometer.
Example 14: Heavily discolored brown at 73.8 hrs. in Weatherometer. Hard & brittle film.
Example 15: Excellent at 207 hrs. in Weatherometer. Film still soft and pliable.
Example 16: Mudcracked at 600 hrs. in Weatherometer. Very slow dry time. Surface dry only at 24 hrs.
Example 17: Chalking and Zn O washing out at 600 hrs. in Weatherometer.
Example 18: Heavily discolored at 106 hrs. in Weatherometer.
Example 19: Discolored at 200 hrs. in Weatherometer.
Example 20: Mudcracked at 600 hrs. in Weatherometer. Slowed dry time considerably.

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

For example, particularly preferred formulations may be prepared to be thixotropic for easy application and handling, may be removed by stripping from the substraight as a continuous film, and will typically permit recoating with additional coats of similar composition without wrinkling or lifting of the base coat.

Reference to patents and other literature made in the specification is intended to result in such patents or literature being expressly incorporated herein by reference including any patents or other literature cited within such patents.

What is claimed is:

1. Anti-corrosive, storage stable, solvent-based, solvent-reducible and dispersible coating compositions having a base number in the range of about 50 to about 200, and capable of application and flow on solid substrates, to form a semi-firm self-healing coating comprising:
   A. about 20 to 90% by weight of overbased metal sulfonate, comprising an overbased metal salt of sulfonic acid;
   B. about 0.5 to 25 wt% of a waxy substance selected from the group consisting of waxes, petrolatums and oxidized hydrocarbons;
   C. about 0.1 to 5.0 wt% of sterically hindered tertiary amine having molecular weight of from about 100 to 1500;
   D. from about 0 to about 10% by weight of a diluent oil having a viscosity in the range of from about 100 to about 700 SUS at 210° F.;
   E. from about 5 to about 85% by weight of a aliphatic or aromatic hydrocarbon solvent.

2. A composition according to claim 1 wherein said overbased metal sulfonate comprises the reaction product of an oil soluble, sulfonic acid with an alkaline earth metal, carbon dioxide, water and alcohols or alcohol-derivatives.

3. A composition according to claim 2 wherein said oil soluble sulfonic acids are either obtained synthetically or naturally.

4. A composition to claim 2 wherein said alkaline earth metal is selected from the group consisting of magnesium, barium, calcium, strontium or lead.

5. A composition according to claim 2 wherein preferred alkaline earth metal is calcium.

6. A composition according to claim 2 wherein said alcohol comprises methanol.

7. A composition according to claim 2 wherein said overbased metal sulfonate is calcium sulfonate.

8. A composition according to claim 2 wherein said alcohol-derivative are selected from the group consisting of methyl cellosolve, ethyl cellosolve and butyl cellosolve.

9. A composition according to claim 8 wherein the sulfonate is the reaction product of calcium sulfonate with excess of calcium, methyl alcohol, carbon dioxide and water.

10. A composition according to claim 1 wherein the waxy substance comprises microcrystalline wax.

11. A composition according to claim 1 wherein the waxy substances of said oxidized hydrocarbons are hydrocarbon wax oxidate, a petrolatum oxidate, or mixtures thereof.

12. The composition of oxidized hydrocarbon wax, oxidized petrolatum or mixtures thereof having an acid number ranging from about 5 to 120.

13. A composition according to claim 1 wherein said composition is thixotropic.

14. A composition according to claim 1 wherein said composition is capable of lubricity.

15. A composition according to claim 1 wherein said composition comprises pigments.

16. A composition according to claim 1 wherein said composition is removable by stripping.

17. A composition according to claim 1 wherein said composition is recoatable with an additional coats of similar composition.

18. A composition according to claim 1 wherein said hydrocarbon solvent comprises mineral spirits.

19. A composition according to claim 1 wherein the sterically hindered tertiary amine comprises a piperidine derivative.

20. A composition according to claim 19 wherein the piperidinal derivative is also a derivative of sebacic acid.

21. A method for coating solid substrates wherein said composition of claim 1 is applied to metal.

22. A method for coating solid substrates wherein said composition of claim 1 is applied to ferrous metals.

23. A method for coating solid substrates wherein said composition of claim 1 is applied by dipping.

24. A method for coating solid substrates wherein said composition of claim 1 is applied by brushing.

25. A method for coating solid substrates wherein said composition of claim 1 is applied by rolling.

26. A method for coating solid substrates wherein said composition of claim 1 is applied by spraying.

27. A method for coating solid substrates wherein said composition of claim 1 is applied by airless spraying.

28. A method for coating solid substrates wherein said composition of claim 1 is applied by electrostatic spraying.

29. An article of manufacture comprising a substrate coated with a coating composition of claim 1.

30. A composition of claim 1 additionally comprising (2,-hydroxy-3,,5,-di-tert-amylphenyl) 2(2,-hydroxy-3,5,-di-tert-amylpheny)benzo triazol.

31. A composition according to claim 1 additionally comprising from 0 to 5 percent of a substituted benzotriazole.

32. A method according to claim 21 wherein said composition additionally comprises 2 (2'-hydroxy-3',5'-di-tert-amylphenyl)benzo triazole.

* * * * *